Sept. 23, 1958 S. O. NEWMAN 2,853,612

AUTOMATIC FREQUENCY CONTROL SYSTEM

Filed July 12, 1954

INVENTOR
SHELDON O. NEWMAN
BY
R. F. Spencer
AGENT

United States Patent Office 2,853,612

Patented Sept. 23, 1958

2,853,612

AUTOMATIC FREQUENCY CONTROL SYSTEM

Sheldon O. Newman, East Meadow, N. Y., assignor to Sperry Rand Corporation, a corporation of Delaware Application July 12, 1954, Serial No. 442,500

5 Claims. (Cl. 250—36)

The present invention relates to automatic frequency control systems, and in particular to an improved automatic frequency control system for stabilizing the frequency of an ultra-high-frequency oscillator with respect to the resonant frequency of an ultra-high-frequency resonant circuit device.

One well known type of system for automatically stabilizing the frequency of an U. H. F. oscillator involves the method of frequency modulating the U. H. F. oscillator with a reference low-frequency alternating voltage and applying a portion of the frequency-modulated output signal from the oscillator to an U. H. F. reference resonant device, such as a cavity resonator. The cavity resonator transforms the applied frequency-modulated signal into an amplitude-modulated signal, and a detector coupled to the resonator detects the amplitude-modulated signal to obtain the low-frequency modulating voltage. A phase comparator having a first input for receiving the detected low-frequency modulating voltage and having a second input for receiving the reference low-frequency alternating voltage produces an output control voltage whose magnitude and polarity is determined by the relation between the average frequency of the frequency-modulated oscillator and the resonant frequency of the cavity resonator. This output control voltage is applied to the U. H. F. oscillator to stabilize its average frequency to a value equal to the resonant frequency of the cavity resonator. Systems of this type are described in Patents 2,640,156 and 2,462,857.

A modification of this prior AFC system involves the method of alternately varying the resonant frequency of the cavity resonator instead of frequency modulating the U. H. F. oscillator. The reference low-frequency alternating voltage is applied to an electromechanical modulator coupled to the U. H. F. reference cavity resonator for alternately varying its resonant frequency. The detector coupled to the cavity resonator receives an amplitude-modulated signal whose amplitude varies at the frequency of the reference low-frequency alternating voltage. The detected modulating voltage is supplied to the phase comparator where it is compared in phase with the reference low-frequency alternating voltage to produce an output frequency control voltage. This frequency control voltage is applied to the U. H. F. oscillator to stabilize its frequency to a value equal to the average resonant frequency of the modulated cavity resonator. Systems of this latter type are described in Patents 2,462,294 and 2,404,568.

In certain applications where a stable frequency source of U. H. F. energy is required it is necessary to stabilize the frequency of the U. H. F. oscillator without frequency modulating its output. This requirement eliminates the possibility of using the above first mentioned type of AFC system. It is further desirable to eliminate any mechanical modulation or vibration of the reference cavity resonator due to the inherent disadvantages of such a system, such as mechanical wear which results in a changing response characteristic of the cavity resonator with age.

The present invention is concerned with an improved AFC system for stabilizing the frequency of an U. H. F. oscillator which is not subject to the limitations and disadvantages of the above mentioned prior art systems.

Accordingly, a principal object of the present invention is to automatically stabilize the frequency of an U. H. F. oscillator with respect to the resonant frequency of an U. H. F. resonant circuit device without frequency modulating the U. H. F. oscillator.

Another object of the invention is to automatically control the frequency of an U. H. F. oscillator with respect to the resonant frequency of an U. H. F. reference resonant circuit device without varying the resonant frequency of the reference resonant circuit device.

Still another object is to stabilize an U. H. F. oscillator at a fixed frequency separated by a predetermined frequency difference from the resonant frequency of an U. H. F. resonant circuit device.

In accordance with the present invention there is introduced an improved automatic frequency control system for stabilizing the frequency of an ultra-high-frequency oscillator. A portion of the output energy from the U. H. F. oscillator is supplied to a mixer where it is combined with the output from a high-frequency oscillator. The high-frequency oscillator is frequency modulated by a reference alternating voltage preferably in the supersonic frequency range. The mixer produces a frequency-modulated output signal including the sum and difference frequencies of the U. H. F. oscillator and the high-frequency frequency-modulated oscillator. This frequency-modulated output signal is supplied to a high Q resonator where the difference frequency component is selected and transformed into an amplitude-modulated signal. A detector coupled to the resonator rectifies the amplitude-modulated signal to obtain the supersonic modulating voltage. This detected modulating voltage is amplified by a selective amplifier tuned to the supersonic frequency, and the amplified output voltage is supplied to one input of a phase comparator. The reference alternating voltage is supplied through an adjustable phase shifter to another input of the phase comparator and serves as a phase reference voltage. The phase comparator produces a direct output control voltage whose magnitude varies according to the difference in frequency between the average value of the difference frequency component of the frequency-modulated signal supplied to the high Q resonator and the resonant frequency of the resonator. The polarity of this direct control voltage is determined by whether the average value of the difference frequency component is above or below the resonant frequency of the resonator. The output control voltage is supplied to the U. H. F. oscillator to stabilize the frequency of its output energy. This output energy is stabilized at a frequency equal to the resonant frequency of the high Q resonator plus the average frequency of the frequency-modulated high-frequency oscillator.

The above objects of and the brief introduction to the present invention will be more fully understood and further objects and advantages will become apparent from a careful study of the following detailed description in connection with the drawing, wherein.

Figures 1, 2:
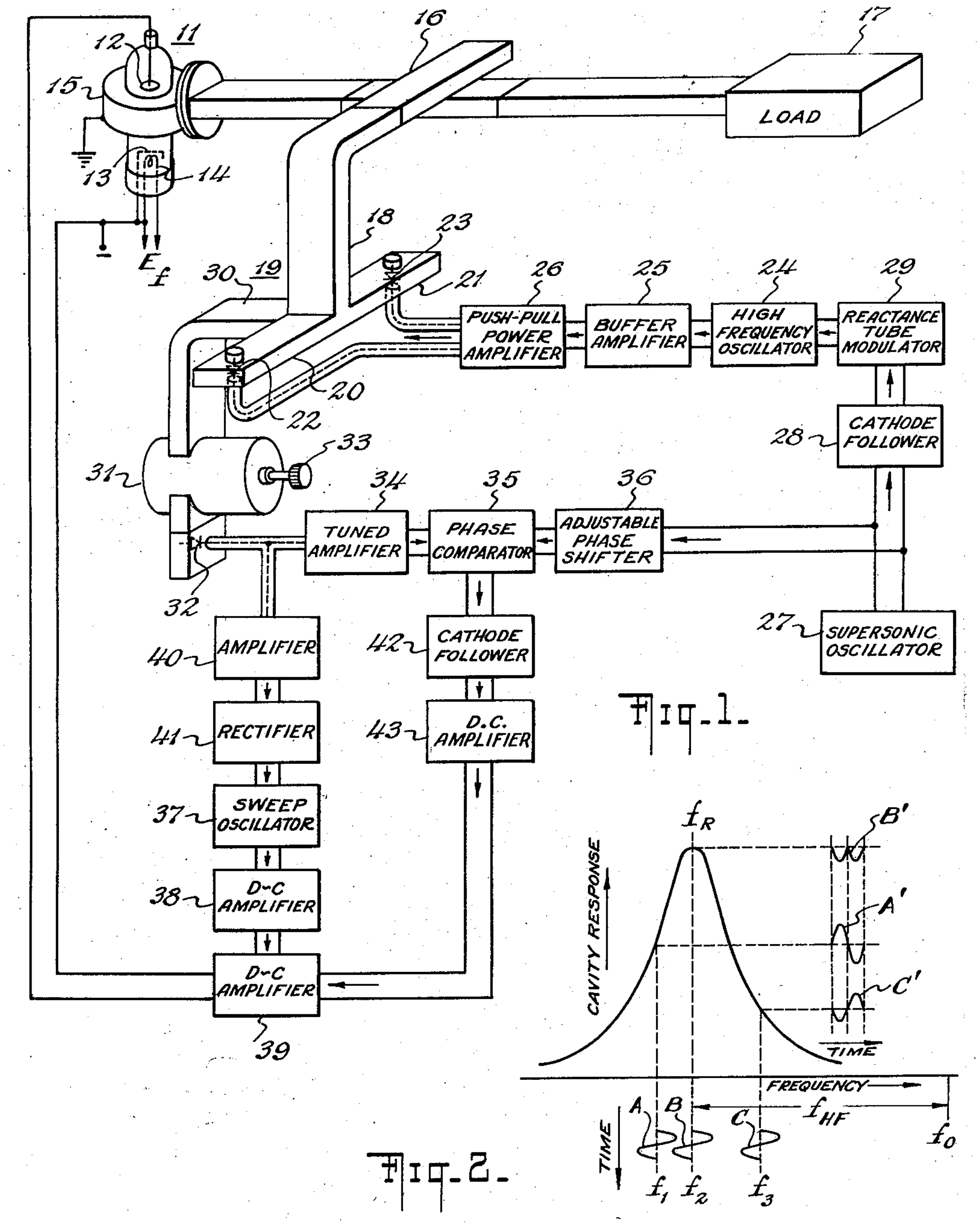
Fig. 1 shows a block diagram of the automatic frequency control system of the present invention.
Fig. 2 is a response curve illustrating the principle of operation of the automatic frequency control system of the present invention.

Referring to Fig. 1, a reflex klystron 11 having a reflector electrode 12, a cathode 13, and a heater element 14, supplies ultra-high-frequency energy from its resonator 15 through a section of wave guide and a directional coupler 16 to a load 17. A portion of this energy is extracted by the directional coupler and supplied to the series arm 18 of a magic-Tee balanced mixer 19. This portion of U. H. F. energy divides equally between the symmetrical arms 20 and 21 thereby supplying equal amounts of energy to detector elements 22 and 23 situated respectively in these symmetrical arms. These detector elements 22 and 23 are further excited by frequency-modulated energy obtained from the high-frequency oscillator 24 and supplied through the buffer amplifier 25 and the push-pull power amplifier 26 to the detector elements. The high-frequency frequency-modulated power supplied to detector element 22 from the push-pull power amplifier 26 is out-of-phase with the frequency-modulated power supplied to the detector element 23.

The high-frequency oscillator 24 is frequency modulated preferably at a supersonic frequency by the output voltage from the supersonic oscillator 27 coupled through cathode follower 28 to a reactance tube modulator 29. The high-frequency oscillator may, for example, produce an output voltage at an average frequency of 24 megacycles per second, and the supersonic oscillator may produce a sinusoidal modulating voltage of 100 kilocycles per second. With a frequency modulation index of two, the high-frequency oscillator will vary in frequency by approximately plus and minus 200 kilocycles per second about its average frequency of 24 megacycles per second.

Balanced mixer 19 combines the frequency-modulated energy from the high-frequency oscillator 24 with the portion of energy from the reflex klystron 11, and produces an output signal in its shunt arm 30 having frequency components equal to the sum and the difference frequencies of the reflex klystron output and the frequency-modulated high-frequency oscillator output. These frequency-modulated output signal components are supplied over shunt arm 30 to a high Q cavity resonator 31. There is very little energy present in the shunt arm 30 at the frequency $f_0$ of the reflex klystron since this energy cannot be conveyed from the series to the shunt arm when the two symmetrical arms 20 and 21 are balanced, as is well known in the art.

The high Q cavity resonator 31 is tuned to select the difference frequency component of the frequency-modulated output signal and to reject the sum frequency-modulation component. The cavity resonator further transforms the frequency-modulated difference frequency component signal into an amplitude-modulated signal and supplies this amplitude-modulated signal to detector element 32. The resonant frequency $f_R$ of cavity resonator 31 is tunable by a knob 33 which controls the position of a shaft extending into the resonator and attached to a piston member therein.

The detected modulating voltage from detector element 32 is applied to an amplifier 34 tuned to the frequency of the supersonic oscillator 27, and the amplified output voltage from amplifier 34 is supplied to one input of phase comparator 35. The supersonic voltage from the oscillator 27 which frequency modulates high-frequency oscillator 24 is also supplied through an adjustable phase shifter 36 to a second input of phase comparator 35.

A low-frequency sweep oscillator 37 supplies an alternating sweep voltage through direct-coupled amplifiers 38 and 39 to the reflector electrode 12 of reflex klystron 11. This sweep voltage slowly varies the frequency $f_0$ of the klystron oscillator over a predetermined range, for example, approximately plus and minus 10 megacycles per second at an average klystron oscillator frequency of approximately 6000 megacycles per second. The difference frequency component between the frequency of the klystron oscillator $f_0$ and the frequency-modulated high-frequency oscillator 24 at the output of mixer 19 slowly varies over the predetermined frequency range of plus and minus 10 megacycles per second. This range of sweep enables the frequency-modulated difference frequency component from the mixer 19 to be swept within the response characteristic of the cavity resonator 31, as illustrated in Fig. 2. When this frequency-modulated difference frequency component is swept within the response characteristic of the cavity resonator, the frequency-modulated component is transformed into an amplitude-modulated output signal. The amplitude-modulated signal is detected in the detector 32, and the detected modulating voltage is supplied to an amplifier 40. The amplified modulating voltage is supplied to rectifier 41 which produces a negative direct control voltage for arresting or disabling the sweep oscillator 37.

Fig. 2 shows the frequency response characteristic of the cavity resonator 31, and illustrates how the applied frequency-modulated difference frequency component from balanced mixer 19 is transformed into an amplitude-modulated signal. When this difference frequency component is at the average frequency $f_1$ and less than the resonant frequency $f_R$ of the cavity resonator, the sinusoidally frequency-modulated component represented by the waveform A is transformed into an amplitude-modulated signal whose envelope is represented by the waveform A'. The amplitude-modulated signal increases to a maximum value as the instantaneous frequency of the frequency-modulated difference frequency component as represented by waveform A increases to a maximum. The detected modulating signal voltage, represented by waveform A', is supplied from detector 32 to tuned amplifier 34, and the amplified output signal is supplied to one input of phase comparator 35. The sinusoidal reference voltage from supersonic oscillator 27 which frequency modulates the high-frequency oscillator 24 is also supplied through an adjustable phase shifter 36 to another input of phase comparator 35. If during the positive half-cycle of the supersonic modulating voltage from oscillator 27 the frequency of the high-frequency oscillator 24 decreases, then the frequency-modulated difference frequency component as represented by waveform A will increase. Accordingly, the amplitude-modulated signal from the detector 32 increases during the positive half-cycle of the modulating voltage. With no phase inversion in tuned amplifier 34 the two voltages to the phase comparator 35 are in-phase for the condition when the average frequency $f_1$ of the difference frequency component is less than the resonant frequency $f_R$ of cavity resonator 31.

The phase comparator 35 produces a direct error control voltage whose polarity is determined by the relative phase difference between the two applied voltages, and whose magnitude varies according to the magnitude of the detected modulating voltage from detector 32. This direct error control voltage is coupled through cathode follower 42 and amplified by direct-coupled amplifiers 43 and 39 and supplied to the reflector electrode 12 of klystron 11. The amplified error control voltage at the reflector 12 is of such polarity as to produce an increase in the frequency $f_0$ of the klystron oscillator until the average frequency of the frequency-modulated difference frequency component increases from $f_1$ to $f_2$.

When the average frequency of the frequency-modulated difference frequency component increases to $f_2$, the cavity resonator transforms the frequency-modulated signal of waveform B into an amplitude-modulated signal whose envelope varies according to the waveform B'. The detected envelope voltage of waveform B' is of sufficient magnitude when amplified by amplifier 40 to produce the negative control voltage in rectifier 41 which maintains sweep oscillator 37 disabled.

The detected modulating voltage of waveform B' varies at twice the frequency of the supersonic oscillator 27 when the average frequency $f_2$ coincides with the resonant frequency $f_R$ of the cavity resonator 31. Accordingly, the tuned amplifier 34, tuned to the frequency of supersonic oscillator 27, produces a null output voltage at the first input of phase comparator 35. As a result, phase comparator 35 produces a null output error control voltage which when amplified by direct-coupled amplifiers 43 and 39 maintains the potential at reflector electrode 12 such that the klystron oscillator frequency $f_0$ is equal to the average frequency of the frequency-modulated high-frequency oscillator 24 plus the resonant frequency $f_R$ of cavity resonator 31, i. e. maintains the average frequency of the frequency-modulated difference frequency component $f_2$ equal to the resonant frequency $f_R$ of the cavity resonator 31.

When the average frequency of the frequency-modulated component of the difference frequency signal from mixer 19 is above the resonant frequency $f_R$ of cavity resonator 31, as represented by the frequency $f_3$ in Fig. 2, the detector 32 produces a detected output voltage represented by the waveform C′. The magnitude of this detected voltage decreases as the instantaneous frequency of the frequency-modulated difference frequency component represented by the waveform C increases. As a result, the phase of the detected voltage of waveform C′ is reversed compared to the detected voltage of waveform A′. Accordingly, the phase comparator 35 produces a direct error control voltage whose polarity is reversed when the average frequency $f_3$ is above the resonant frequency $f_R$ of the cavity resonator compared to the condition when the average frequency $f_1$ is below the resonant frequency $f_R$ of cavity resonator 31. This error control voltage of reversed polarity when amplified by direct-coupled amplifiers 43 and 39 alters the reflector electrode potential of klystron oscillator 11 so as to reduce the frequency $f_0$ until the average value of the frequency-modulated difference frequency component coincides with the resonant frequency $f_R$ of the cavity resonator 31.

With a cavity resonator Q of 4,500 and with a reflex klystron producing output power at a frequency of approximately 6000 megacycles per second, one AFC system in accordance with the present invention was found to pull in and stabilize the frequency of the klystron oscillator 11 when the average frequency of the frequency-modulated difference frequency component was swept within approximately plus or minus 5 megacycles per second of the resonant frequency $f_R$ of cavity resonator 31.

While the high Q cavity resonator 31 has been tuned to select the frequency-modulated difference frequency component from mixer 19 and to reject the sum frequency component in the embodiment described, it is apparent that the improved AFC system could be arranged to select the frequency-modulated sum frequency component and to reject the difference frequency component if desired.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. An automatic frequency control system comprising in combination a first oscillator whose frequency is to be controlled, a second oscillator, modulating means coupled to said second oscillator for frequency modulating the output therefrom, mixer means coupled to the outputs of said first and second oscillators said mixer means producing a frequency-modulated output signal having frequency components including the sum and difference frequencies of said first and second oscillators, a reference resonator means coupled to the output of said mixer means, said resonator means selectively passing one of the frequency-modulated components of said mixer output signal and rejecting other frequency-modulated components of said mixer output signal, detector means coupled to the output of said resonator means for detecting the frequency modulation of the selected frequency-modulated signal, phase comparator means having a first input coupled to the output of said detector means and having a second input coupled to said modulating means, said phase comparator producing an output control voltage varying in magnitude according to the strength of the detected frequency-modulated signal, the polarity of said output control voltage being determined according to the phase between the detected frequency-modulated signal and the output from said modulating means, means coupling said control voltage to said first oscillator for controlling the frequency thereof, amplifier means coupled to said detector means for amplifying the detected output voltage, rectifier means coupled to the output of said amplifier for producing a rectified control voltage varying in magnitude according to the strength of the detected modulating voltage means coupled to said first oscillator for varying the frequency thereof over a predetermined frequency band, and means coupling said rectified control voltage to the last-named means for disabling said last-named means when said rectified control voltage exceeds a predetermined magnitude.

2. The automatic frequency control system as defined in claim 1 wherein said first oscillator is a reflux klystron, and said reference resonator means is a high Q cavity resonator.

3. The automatic frequency control system as defined in claim 1 wherein the frequency of said first oscillator is higher than the frequency of said second oscillator, and the frequency of said second oscillator is higher than the frequency of the modulating voltage from said modulating means.

4. An automatic frequency control system comprising in combination an oscillator whose frequency is to be controlled, a source of frequency-modulated energy, means coupled to said oscillator and said source for combining the output from said oscillator with said frequency-modulated energy, said combining means producing a frequency-modulated output signal having frequency components including the sum and difference frequencies of the output from said oscillator and said source of frequency-modulated energy, resonator means coupled to the output of said combining means and responsive to one of the frequency-modulated components of said frequency-modulated output signal, said resonator means being nonresponsive to the other frequency-modulated components of said frequency-modulated output signal, said resonator means transforming said frequency-modulated component into an amplitude-modulated component, detector means coupled to said resonator for detecting said amplitude-modulated component and producing the frequency modulating voltage, phase comparator means having a first input coupled to said detector for receiving said detected frequency modulating voltage and having a second input coupled to said source of frequency-modulated energy, said phase comparator producing an output control voltage varying in magnitude according to the magnitude of the detected frequency modulating voltage, the polarity of said control voltage being determined according to the phase between the detected frequency modulating voltage and the modulating voltage of said source of frequency-modulated energy, means coupling said output control voltage to said oscillator for controlling the frequency thereof, amplifier means coupled to said detector means for amplifying the detected output voltage, rectifier means coupled to the output of said amplifier for producing a rectified control voltage varying in magnitude according to the strength of the detected modulating voltage, means coupled to said oscillator for varying the frequency thereof over a predetermined frequency band and means coupling said rectified control voltage to the last-named means for disabling said last-named means when said rectified control voltage exceeds a predetermined magnitude.

5. An automatic frequency control system comprising in combination a reflex klystron whose frequency is to be controlled, a source of frequency-modulated energy including a high-frequency generator and a source of modulating voltage, means coupled to the output of said reflex klystron and to said source of frequency-modulated energy for combining a portion of the output energy from said reflex klystron with said frequency-modulated energy, said combining means producing a frequency-modulated output signal having frequency components including the sum and difference frequencies of the output from said reflex klystron and said source of frequency-modulated energy, cavity resonator means coupled to the output of said combining means and responsive to one of the frequency-modulated components of said frequency-modulated output signal, said cavity resonator means transforming said frequency-modulated components into an amplitude-modulated component, detector means coupled to said resonator for detecting said amplitude-modulated component and producing the modulating voltage, phase comparator means having a first input coupled to the output of said detector means for receiving said detected modulating voltage, said phase comparator means having a second input coupled to the source of modulating voltage, said phase comparator means producing an output frequency control voltage varying in magnitude according to the displacement in frequency between the average frequency of the frequency-modulated component supplied to said cavity resonator and the resonant frequency of said cavity resonator, said output frequency control voltage reversing in polarity as the average frequency of the frequency-modulated component supplied to said cavity resonator varies from above the resonant frequency of said cavity resonator to below the resonant frequency of said cavity resonator, means coupling said frequency control voltage to the reflector electrode of said reflex klystron for controlling the frequency thereof, amplifier means coupled to said detector means for amplifying the detected output voltage, rectifier means coupled to the output of said amplifier for producing a rectified control voltage varying in magnitude according to the strength of the detected modulating voltage, sweep oscillator means producing a low-frequency sweep voltage coupled to said reflex klystron for varying the frequency of said reflex klystron over a predetermined frequency band, and means coupling said rectified control voltage to said sweep oscillator for disabling said sweep oscillator when said rectified control voltage exceeds a predetermined magnitude.

References Cited in the file of this patent

UNITED STATES PATENTS

| | | |
|---|---|---|
| 2,434,294 | Ginzton | Jan. 13, 1948 |
| 2,450,019 | Ranger | Sept. 28, 1948 |
| 2,462,841 | Bruck | Mar. 1, 1949 |
| 2,474,278 | Ranger | June 28, 1949 |
| 2,486,001 | Bruck et al. | Oct. 25, 1949 |
| 2,510,095 | Frankel | June 6, 1950 |
| 2,681,998 | Pound | June 22, 1954 |